Patented Apr. 9, 1940

2,196,495

UNITED STATES PATENT OFFICE 2,196,495

ISOPROPANOLAMINE SALTS OF THEOPHYLLINE AND PROCESS OF MAKING THEM

Frederick R. Greenbaum, Philadelphia, Pa., assignor to The National Drug Company, Philadelphia, Pa., a corporation of Pennsylvania No Drawing. Application May 3, 1937,
Serial No. 140,451

2 Claims. (Cl. 260—253)

My invention relates to the formation of a water-soluble salt of theophylline, and more specifically its combination with isopropanolamine in both crystals and in solution.

Theophylline is a recognized remedy in certain heart conditions, such as, angina pectoris, coronary thrombosis, cardiac edema, etc. However, its slight solubility has limited it usefulness; so that heretofore it has been generally found necessary to make certain double salts of it, in order to obtain salts of sufficient solubility for therapeutic use.

The first successful attempt to produce such double salt was the combination of ethylenediamine and theophylline described in United States Patent No. 919,161, issued April 20, 1909. In this patent Reinhold Grüter described the formation of a water-soluble compound of theophylline with ethylenediamine and with piperazine. Theophylline ethylenediamine has become established in the medical profession under the name of Aminophyllin, and is now official in The United States Pharmacopeia XI.

While Aminophyllin appears to be a satisfactory product, other combinations have been made. I refer to United States Patent No. 1,867,-332, issued July 12, 1932, to H. A. Shonle for combinations of theophylline with mono- and tri-ethanolamine.

In the German Patent No. 583,054, Erwin Kohlstadt, described a di-ethanolamine combination of theophylline, soluble in water up to a 20% concentration of theophylline.

A recent contribution is described in United States Patent No. 2,066,731, issued January 5, 1937, to Walter Kropp for a neutral water-soluble complex compound of theophylline with a water-soluble salt of meta-hydroxybenzoic acid.

While this combination of theophylline with sodium meta-hydroxybenzoate, may be somewhat closely related to theophylline sodium salicylate, theophylline sodium meta-hydroxybenzoate is an isomer of the sodium salicylate combination, and the objections offered to sodium salicylate combination is they cannot be administered to persons with weakened blood circulation and apply equally to the sodium meta-hydroxybenzoate salt.

In my search for a theophylline compound, possessing the desired characteristics and suitable for the purposes hereinbefore mentioned, I first tried combinations of theophylline with the bases morpholine, propylene diamine, and ethylamine, in mono-molecular proportions; also the combination of theophylline with the same bases in di- and tri-molecular proportions. However, the resulting compounds in each case failed to possess sufficient solubility in water to warrant further study. I then combined theophylline with piperidine, and with triethylenetriamine in mono- and poly-molecular proportions. These compounds, however, are but slightly soluble, are unstable and when allowed to stand from six to eight weeks become toxic.

I have succeeded in producing new isopropanolamine salts of theophylline, both in solid form and in solution. These salts have a greater solubility than theophylline, especially the mono-isopropanolamine salt. I have used the mono-isopropanolamine, the di-isopropanolamine and tri-isopropanolamine, and have found the mono-isopropanolamine produces the most soluble salt. The higher solubility of mono-isopropanolamine theophylline makes this a most suitable salt for therapeutic use. These salts are white crystal-like substances when in solid form, and have the specific therapeutic action of theophylline. Furthermore, they are stable, being non-hygroscopic and do not discolor when exposed to air.

The isopropanolamines have been used orally and by injection as a vehicle for sodium bismuthate by P. J. Hanzlik, A. J. Lehman and A. P. Richardson (American Journal of Syphilis, Gonorrhea and Venereal Diseases, vol. 21, p. 1, January, 1937) and possess low toxicity.

In preparing the isopropanolamine salts, one mol (molecular weight in grams) of theophylline is suspended in a suitable solvent, such as water or ethyl alcohol, to this is added one mol of the isopropanolamine. The amount of water or alcohol used is the amount required to dissolve the resulting isopropanolamine salt of theophylline. If the salt is desired in solution form, it is filtered, brought to a given concentration, and may be filled into ampuls or other desired containers. However, if the salt is desired in solid form, the solution is concentrated under vacuum, avoiding exposure to $CO_2$, until the salt crystallizes and the evaporation is desirably stopped, while a small quantity of mother liquor remains. The solid salts or crystals are collected and dried at room temperature, and the solid salts or crystals may be administered orally in capsules, in tablets, or may be given in solution. The salts thus obtained have the following formula as mono-isopropanolamine salts:

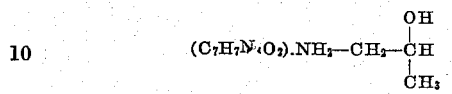

as di-isopropanolamine salt:

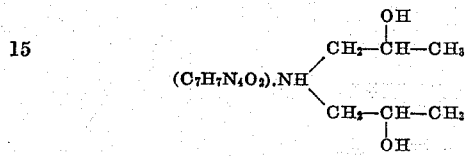

as tri-isopropanolamine salt:

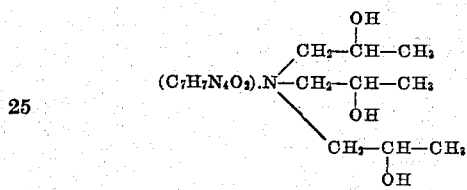

The following are examples of salts embodying my invention and the processes for making them.

*Example 1.*—198 grams of theophylline monohydrate are suspended in 700 cc. of distilled water, and to this solution 75 grams of mono-isopropanolamine are added. On stirring at room temperature, the theophylline goes into solution as its mono-isopropanolamine salt. Thus, a solution containing 18% to 20% free theophylline may be easily prepared. If the solid salt is desired, the amount of water used is decreased to approximately 130 grams. The resulting solution is heated almost to the boiling point, and 75 grams of isopropanolamine are added, after which the 198 grams of theophylline monohydrate are gradually added under stirring, until a hot saturated solution is obtained. Upon cooling the theophylline isopropanolamine settles out as it crystallizes. This is filtered off and air dried at room temperature.

The theophylline mono-isopropanolamine has the following formula:

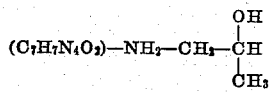

It is a bitter tasting white solid, readily soluble in water, less soluble in 95% alcohol and almost insoluble in ether. Its aqueous solution is alkaline to phenolphthalein. The solid salt melts with decomposition at 142.6° C.

*Example 2.*—19.8 grams of theophylline monohydrate are added to about 500 cc. of 95% ethyl alcohol, and to this are added 7.5 grams of mono-isopropanolamine. On stirring and warming, the theophylline goes into solution as its mono-isopropanolamine salt. The alcoholic solution of mono-isopropanolamine theophylline is filtered, evaporated under vacuum to just short of dryness. This salt is identically the same as the one obtained from an aqueous solution described in Example 1, and may be dissolved in water whenever desired, to provide an 18% to 20% solution.

In the same manner a combination of theophylline with di-isopropanolamine and with tri-isopropanolamine are formed, with the exception that only 133 grams of the di-compound are used and 191 grams of the tri-compound.

Because of the wide acceptance of Aminophyllin as a standard and useful therapeutic product, theophylline isopropanolamine was compared with it, and has been proved to compare favorably therewith, and comprises an improvement thereover. Theophylline isopropanolamine is a very alkaline salt, and when dissolved in water shows a pH value of 9.30. In a dose of 0.1 cc. it produces slight necrosis, when injected intracutaneously in rabbits; intramuscularly a 2 cc. dose causes but slight infiltration with slight rise in temperature; intravenously 15 cc. is the maximum tolerated dose (M. L. D.). The hemolytic action of dilute theophylline isopropanolamine is slightly greater than that of Aminophylline, neither product exerts any diuretic action, when compared with the urinary discharge of a normal rabbit. Extensive tests have proved theophylline isopropanolamine is of low toxicity, is of increased solubility, possesses the therapeutic action of theophylline.

Having thus described my invention, what I claim as new and desire to protect by Letters Patent of the United States is:

1. A pharmaceutical preparation, containing an isopropanolamine salt of theophylline, having definite melting points and crystal structure, being readily soluble in water, less soluble in 95% alcohol, and almost insoluble in ether.

2. An isopropanolamine salt of theophylline, having definite melting points and crystal structure, being readily soluble in water, less soluble in 95% alcohol, almost insoluble in ether, and packaged in therapeutic doses.

FREDERICK R. GREENBAUM.